(12) United States Patent
Sperber et al.

(10) Patent No.: US 8,706,789 B2
(45) Date of Patent: Apr. 22, 2014

(54) PERFORMING RECIPROCAL INSTRUCTIONS WITH HIGH ACCURACY

(75) Inventors: Zeev Sperber, Zichron Yaakov (IL); Cristina S. Anderson, Hillsboro, CA (US); Benny Eitan, Haifa (IL); Simon Rubanovich, Haifa (IL); Amit Gradstein, Ha (IL)

(73) Assignee: Intel Corporation, Santa Clara, CA (US)

( * ) Notice: Subject to any disclaimer, the term of this patent is extended or adjusted under 35 U.S.C. 154(b) by 771 days.

(21) Appl. No.: 12/976,359

(22) Filed: Dec. 22, 2010

(65) Prior Publication Data
US 2012/0166509 A1    Jun. 28, 2012

(51) Int. Cl.
*G06F 7/38*    (2006.01)

(52) U.S. Cl.
USPC .......................................................... 708/502

(58) Field of Classification Search
USPC .......................................................... 708/502
See application file for complete search history.

(56) References Cited

U.S. PATENT DOCUMENTS

| | | | | |
|---|---|---|---|---|
| 5,278,782 | A * | 1/1994 | Nakano | 708/605 |
| 6,163,791 | A * | 12/2000 | Schmookler et al. | 708/502 |
| 6,256,653 | B1 * | 7/2001 | Juffa et al. | 708/290 |
| 6,341,300 | B1 * | 1/2002 | Shankar et al. | 708/605 |
| 6,349,319 | B1 * | 2/2002 | Shankar et al. | 708/500 |
| 7,117,238 | B1 * | 10/2006 | Foskett et al. | 708/502 |
| 7,346,642 | B1 * | 3/2008 | Briggs et al. | 708/497 |
| 2008/0243985 | A1 | 10/2008 | Tang et al. | |
| 2008/0260145 | A1 | 10/2008 | Trichina | |
| 2009/0037504 | A1 | 2/2009 | Hussain | |

OTHER PUBLICATIONS

Intel 64 and IA-32 Architectures Software Developer's Manual, Instruction Set Reference, N-Z, "RCPSS-Compute Reciprocal of Scalar Single-Precision Floating-Point Values," vol. 2B, pp. 4-308 to 4-309, Nov. 2007.
Intel 64 and IA-32 Architectures Software Developer's Manual, Instruction Set Reference, N-Z, "RCPSS-Compute Reciprocals of Packed Single-Precision Floating-Point Values," vol. 2B, pp. 4-305 to 4-307, Nov. 2007.
International Searching Authority, "Notification of Transmittal of the International Search Report and the Written Opinion of the International Searching Authority," mailed Aug. 27, 2012, in International application No. PCT/US2011/064390.

* cited by examiner

*Primary Examiner* — Chuong D Ngo
*Assistant Examiner* — Kevin G Hughes
(74) *Attorney, Agent, or Firm* — Trop, Pruner & Hu, P.C.

(57) ABSTRACT

In one embodiment, the present invention includes a method for receiving a reciprocal instruction and an operand in a processor, accessing an entry of a lookup table based on a portion of the operand and the instruction, generating an encoder output based on a type of the reciprocal instruction and whether the reciprocal instruction is a legacy instruction, and selecting portions of the lookup table entry and input operand to be provided to a reciprocal logic unit based on the encoder output. Other embodiments are described and claimed.

16 Claims, 6 Drawing Sheets

PERFORMING RECIPROCAL INSTRUCTIONS WITH HIGH ACCURACY

BACKGROUND

Modern processors can implement many different types of mathematical operations responsive to user-level instructions of a given instruction set architecture (ISA). Common operations include typical arithmetic operations such as additions, subtractions, and so forth. Furthermore, some processor ISAs provide user-level instructions for additional functions such as reciprocals and square root reciprocals. As examples, some processors implement a reciprocal operation with a user-level instruction called RCP and a square root reciprocal operation with a user-level instruction called RSQRT. These instructions, which respectively deliver reciprocal and square-root-reciprocal approximations, use a lookup table.

However, these existing RCP and RSQRT instructions have a relative error on the order of $2^{-11}$ for most cases. In addition these instructions do not provide correct results for very small numbers or so-called denormal values. As a result of these limitations, users can choose to not use these instructions, or to provide software overhead for resolving these cases. For example, for denormal operands a secondary path may be used to handle these operations. And for obtaining a greater accuracy than available by the user-level instruction, additional overhead is consumed in a main path by performing additional iterations of a given algorithm.

DETAILED DESCRIPTION

Figure 1:
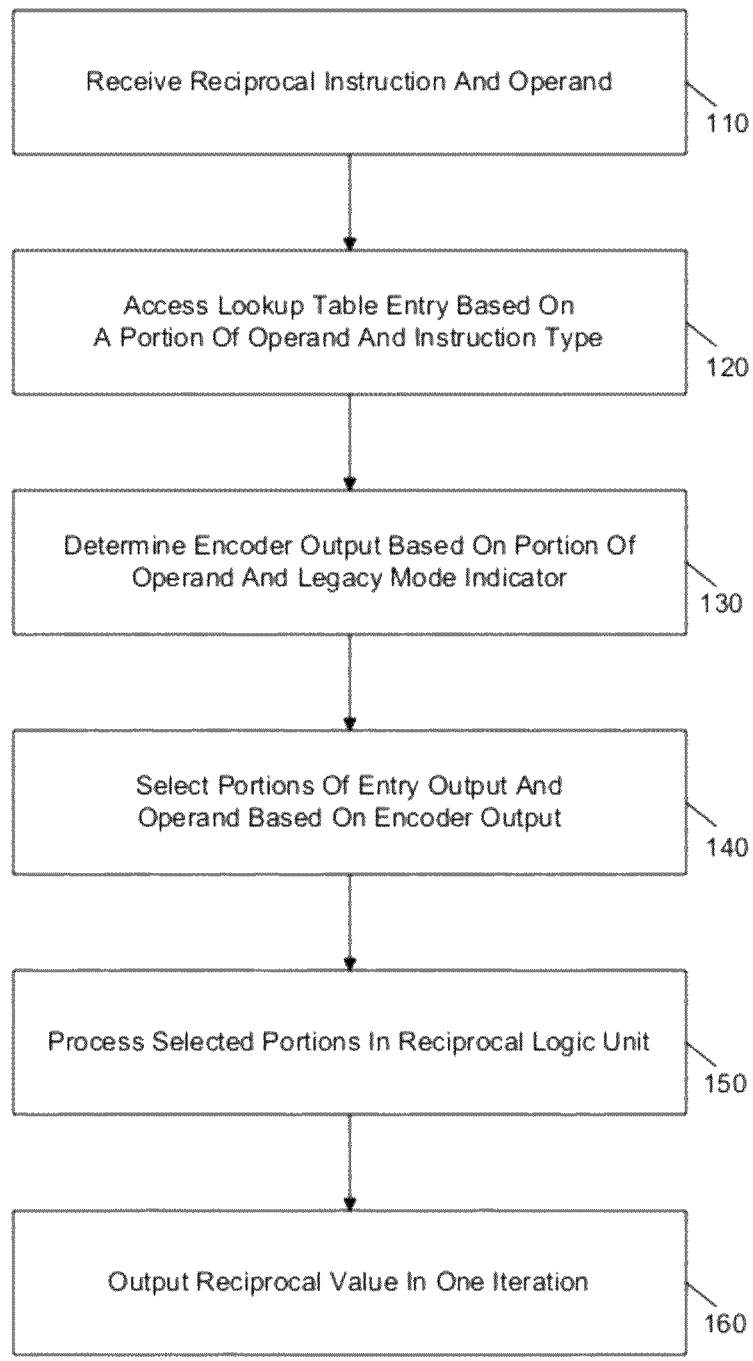
FIG. 1 is a flow diagram of a method in accordance with one embodiment of the present invention.

Embodiments may provide user-level instructions to perform reciprocal operations with very high precision. Also, in some embodiments instructions may provide an accuracy of better than $2^{-14}$. Also, embodiments may be used to perform such reciprocal operations on denormal input operands and close to infinity operands. Still further, by using instructions in accordance with an embodiment of the present invention, reciprocal operations can be performed faster, as the need for multiple iterations can be avoided.

Two user-level instructions may be provided, namely a reciprocal operation instruction that can perform a reciprocal operation in one iteration and provide a relative accuracy of $2^{-14}$, and a square root reciprocal operation instruction that can perform a square root reciprocal operation in one iteration to provide a similar relative accuracy of $2^{-14}$. In various embodiments these instructions may implement a single iteration of a given algorithm, e.g., Newton-Raphson, Taylor or like algorithms, in order to obtain the above accuracy. In one embodiment, the reciprocal instruction may be identified with the opcode VRCP14 and the square root reciprocal instruction may be identified with the opcode VRSQRT14.

Thus in various embodiments, better accuracy can be achieved and in addition, cases of denormal input operands can be treated correctly. As a result, software overhead can be significantly reduced and application speed improved. For example, as embodiments can handle denormal input operands, there is no need to check for such denormal input operands, and in addition, the result can be determined in a single iteration. Although embodiments may provide for improved accuracy response, a legacy result that corresponds to an expected result for a lower precision of previous reciprocal instructions can also be generated to maintain functionally correct behavior for legacy operation.

As described further below, in various embodiments several optimizations may be implemented to provide for improved relative accuracy of reciprocal operations while increasing computation speed of such operations. More specifically, in the embodiments a modified algorithm may be used to generate a lookup table. That is, instead of using a conventional Taylor series algorithm, a modified algorithm is used, in which an initial point of the computation is selected to be at a midpoint of a given interval. In this way, the relative error of the computation can be reduced and furthermore, hardware used for performing the computation can similarly be reduced, thus enabling reduced die area for the computation. The relative error may be defined as the absolute value of (approximation result-accurate result)/accurate result.

Another optimization relates to providing for full sign elimination. This optimization may be implemented by adding a special constant to the free term "b" in an array that is implemented via a lookup table. More specifically, in the calculation of the following sum: dest=ax+b, the lookup table may store the coefficient "a" and the free term "b". During calculation from the accessed values, this special constant may be added to thus allow for full sign elimination. In this way, hardware for performing sign elimination can be removed, thus reducing die consumption of reciprocal logic in accordance with an embodiment of the present invention.

A still further optimization may relate to providing support for legacy instructions. That is, as discussed above reciprocal instructions previously available provided for a limited relative accuracy, e.g., $2^{-11}$. To enable a programmer to still use such instructions in hardware optimized for user-level instructions in accordance with an embodiment of the present invention, certain correction hardware may be provided. More specifically, in one embodiment additional data may be provided within a lookup table to implement a small number of bits that can be injected into the reciprocal hardware to generate results with the lower precision of legacy instructions. As will be discussed further below, this correction information may be injected into a carry save adder (CSA) structure (while not affecting timing or any other area consideration of the logic). As such, this legacy hardware may generate a result corresponding to the exact legacy values of lower precision reciprocal and square root reciprocal instructions (e.g., RCP and RSQRT) which, in one embodiment, deliver 11 bits.

Referring now to FIG. 1, shown is a flow diagram of a method in accordance with one embodiment of the present invention. As shown in FIG. 1, method 100 may be implemented, e.g., in specialized logic of a processor, to perform reciprocal operations. For example, in one embodiment a processor such as a general-purpose processor may include in its execution unit a reciprocal logic. Such reciprocal logic may include various lookup tables, hardware structures and so forth to perform both reciprocal and square root reciprocal operations responsive to a given user-level instruction.

As seen in FIG. 1, method 100 may begin by receiving a reciprocal instruction and an operand (block 110). For example, in one embodiment the incoming user-level instruction may be for a reciprocal operation on an input operand, and which may seek a result having a very low relative error, e.g., an accuracy of $2^{-14}$. Control passes to block 120 where a lookup table entry may be accessed based on a portion of the operand and the given instruction. More specifically, depending on whether the instruction is for a reciprocal operation or a square root reciprocal operation, different portions of a lookup table may be accessed. Then based on values of certain bits of the operand, a selected entry of the lookup table may be output.

The lookup table output may be provided to hardware of the reciprocal logic which in one embodiment may include a Wallace tree structure. However to determine which portions of the lookup table output and operand are to be operated on in the hardware, control may first pass to block 130, where an encoder output may be determined. More specifically, a Booth or other type of encoder may be used to generate an output based on a first part of the operand and a legacy mode indicator, which indicates whether the received instruction is a reciprocal instruction in accordance with an embodiment of the present invention or a legacy reciprocal instruction that seeks a lesser relative accuracy. Based on these inputs, a selected encoder output is generated and may be provided to the hardware of the reciprocal logic.

Accordingly, control passes to block 140 where portions of the lookup table entry output and input operand may be selected based on the encoder output. Accordingly, the selected portions may be processed, first by generating partial products using the selected portions and the encoder output, and then passed for further processing, e.g., in a Wallace tree structure of the reciprocal logic unit (block 150). Finally, a desired reciprocal value may be output in a single iteration from the reciprocal logic (block 160). Although shown with this particular implementation in the embodiment of FIG. 1, understand the scope of the present invention is not limited in this regard.

Figure 2:
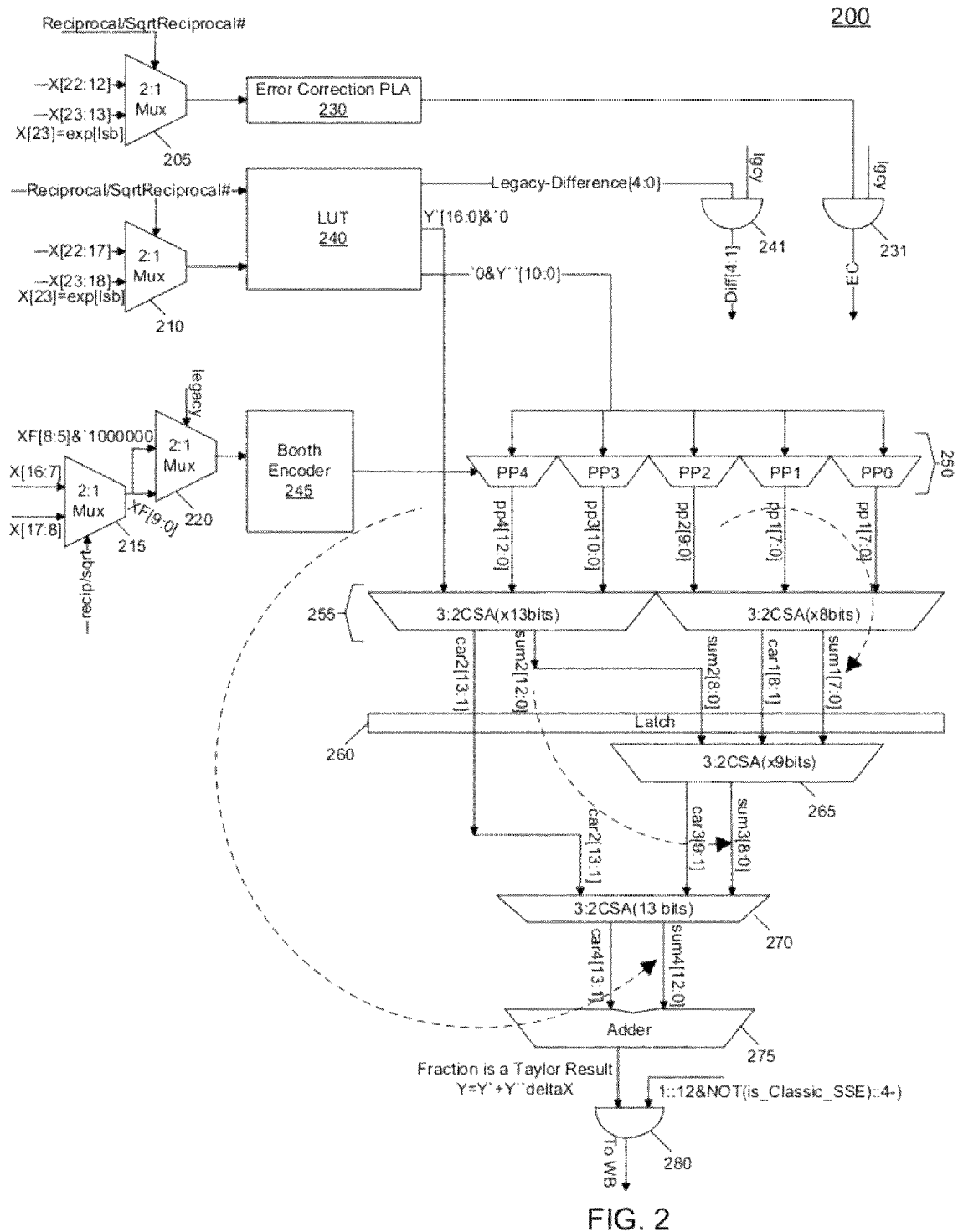
FIG. 2 is a block diagram of a reciprocal logic unit in accordance with an embodiment of the present invention.

Referring now to FIG. 2, shown is a block diagram of a reciprocal logic unit in accordance with an embodiment of the present invention. As seen in FIG. 2, logic unit 200 may include various structures to receive a reciprocal instruction and an input operand and to perform a requested operation responsive to the instruction. Logic unit 200 may include various selectors, including multiplexers 205 and 210. As seen, multiplexers 205 and 210 may be configured to receive different portions of the input operand and may be controlled by the type of reciprocal operation to be performed. Thus as seen, each of these multiplexers may be controlled responsive to the input instruction. Accordingly different parts of the input operand may be provided to, respectively, an error correction programmable logic array (PLA) 230 and a lookup table 240. The PLA output may be provided to a logic gate 231, along with a legacy mode indicator to thus set an error correction bit (EC), when legacy instructions are received.

In various embodiments, lookup table 240 may include entries to store values used to calculate mantissa values for both reciprocal operations and square root reciprocal operations. In various embodiments, this table may be generated to store coefficients Y' and Y" related to midpoint-of-interval. That is, the entries in the table may be calculated for midpoint of an interval such that a given algorithm can converge in a single interval. As seen, lookup table 240 is further configured to receive the instruction itself, which determines whether the entries of the lookup table associated with the reciprocal or the square root reciprocal operation are to be accessed. Based on the input operand, a selected entry may be output by lookup table 240. As seen, in one embodiment this entry may include both a Y' term and a Y" term, as will be discussed further below. In addition, each entry may include a legacy portion, legacy difference [4:0], which provides a legacy correction in accordance with an embodiment of the present invention.

The Y' and Y" terms of the entries may correspond to the free coefficient and approximation of the function's derivative in the sum: ax+b (and thus Y'=a and Y"=b). Note that for sign elimination purposes, a predetermined value may be provided to the free coefficients. In one such embodiment, each Y' term may have a value of −2728 added to it to compensate for sign elimination.

Figure 2A:
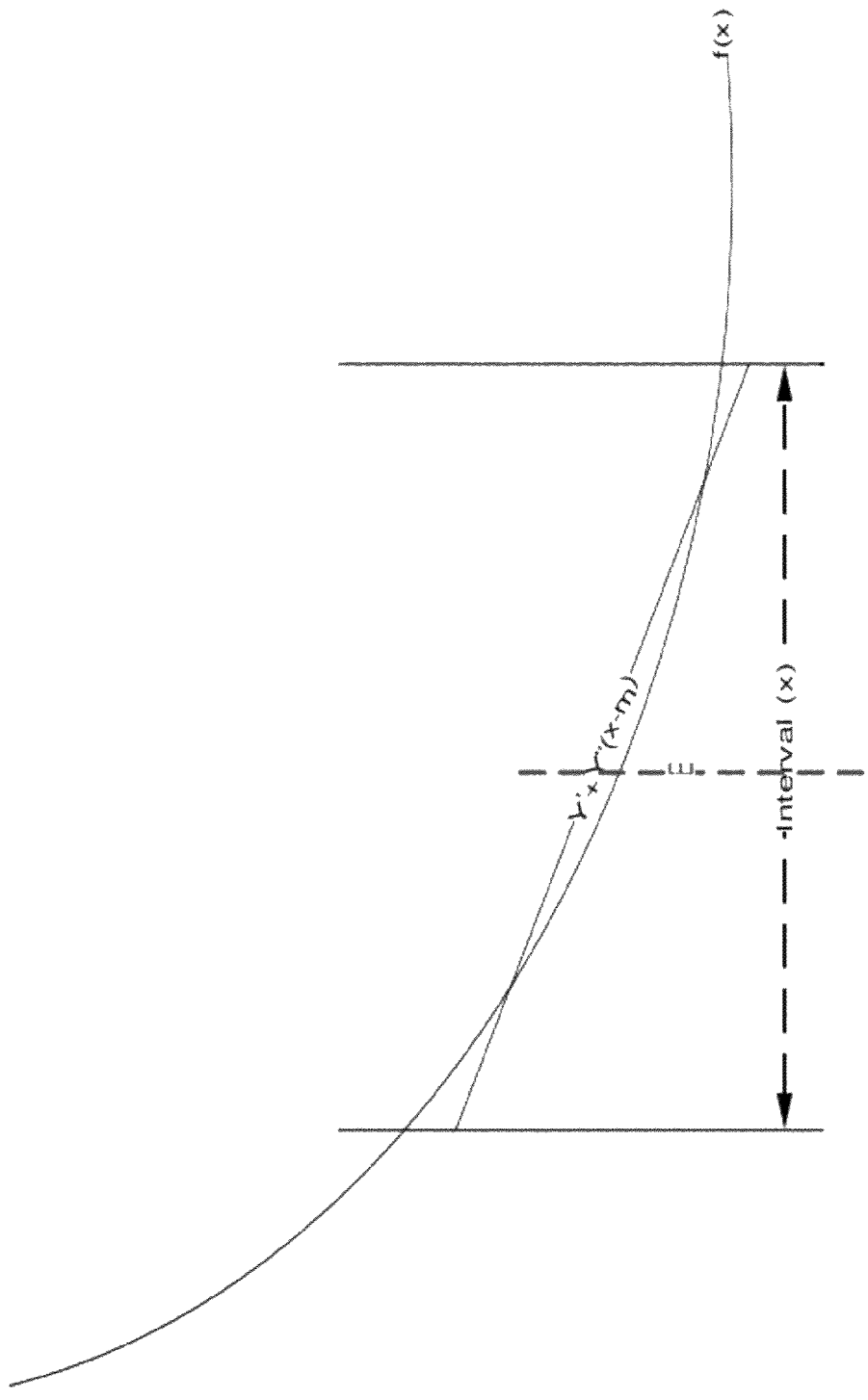
FIG. 2A is a graphical illustration of function values through an interval in accordance with one embodiment of the present invention.

Lookup table 240 may be used to calculate the value of the mantissa of the result, where the mantissa's value is in the range 1.0<=Mantissa<2.0 (note that the exponent is treated separately). This range may be divided, in one embodiment, into 64 intervals. The value of the coefficients in the lookup table is calculated such that f(x) is approximated by Y'+Y"(x−m), where m is the midpoint of the interval and f is reciprocal or square root reciprocal function. The coefficients Y' and Y" are tuned so that the relative error is about one eighth of the relative error if instead the table entries were set at values to one end and real Taylor coefficients are taken and the relative error was calculated at the other hand, as shown in FIG. 2A.

As seen, the Y" term of the output of lookup table 240 along with the legacy portion (when legacy mode is active, as determined via a logic gate 241) is provided to a set of multiplexers 250 which act to generate a selected one of multiple outputs as a partial product provided to a Wallace tree structure that includes a plurality of CSA levels. The inputs to these multiplexers in one embodiment may be as set forth in Table 1.

TABLE 1

| PP0 | PP1 | PP2 | PP3 | PP4 |
|---|---|---|---|---|
| `0::2&x[8]&x#[8]&y`[10:7] | x[10]&y``[10:4] | x[12]&y``[10:2] | x[14]&y``[10:1] | x[16]&y``[10:0] |
| ec&`0&`1&d[2:0]&`0 | x[10]&x#[10]&y``[10:5]`1&d[4:3]&`0:5 | x[12]&x#[12]&y``[10:3] | x[14]&x#[14]&y``[10:2]`1&`0:10 | &`0 x[16]&x#[16]&y`` |
| `0::2&x[8]&x#[8]&y"#[10:7] | x[10]&x#[10]&y`#[10:5] | `1&`0::3&fiz0&fiz`&`0::3 | x[14]&x#[14]&y``#[10:2] | [10:0]`1&`0::12 |
| `0::2&x[8]&y"#[10:6] | x[10]&y"#[10:4] | x[12]&x#[12]&y"#[10:3] | x[14]&y`#[10:1] | x[16]&x#[16]&y"#[10:0] |
|  |  | x[12]&y``#[10:2] |  | x[16]&y"#[10:0]&`1 |

As seen in FIG. 2, multiplexers 250 may be controlled via an output of an encoder 245, where the output acts as a coefficient according to the following truth table.

TABLE 2

Booth Encoding Table for ΔX
$X_1, X_0, X_1$out

| | | | |
|---|---|---|---|
| 0 | 0 | 0 | 0 |
| 0 | 0 | 1 | 1 |
| 0 | 1 | 0 | 1 |
| 0 | 1 | 1 | 2 |
| 1 | 0 | 0 | −2 |
| 1 | 0 | 1 | −1 |
| 1 | 1 | 0 | −1 |
| 1 | 1 | 1 | 0 |

More specifically, multiplexers 250 each may generate a partial product using the coefficient which is also used as a selection value to select one of the multiple inputs to the multiplexer for the partial product multiplication. In one embodiment, encoder 245 may be a Booth encoder that generates the output based on a portion of a selection value, which is provided through a first multiplexer 215 and a second multiplexer 220. As seen, first multiplexer 215 may be controlled to output a selected one of two portions of the input operand based the type of instruction to be executed (reciprocal or square root reciprocal), while second multiplexer 220 may be controlled to output either the selected portion of the input operand or a predetermined value, based on whether the legacy mode is active.

Still referring to FIG. 2, the partial products (PP0-PP4) that are the generated outputs from multiplexers 250 are provided to a first level of CSA adders 255, which is formed of a high order CSA adder which in one embodiment may be a 13 bit wide CSA structure, and a low order CSA adder which in one embodiment may be an 8 bit wide CSA structure. In addition, the Y' term output from the selected entry of lookup table 240 may also be provided to high order CSA adder 255. As seen, the resulting carry and sum outputs may be coupled through a latch 260 to a second level CSA adder 265 which in one embodiment may be a 9 bit wide adder.

In turn, carry and sum outputs, along with the carry portion of the high order CSA adder of the first level structure 255 may be provided to a third level CSA adder 270 that in turn generates another sum and carry output. These values are provided, along with a portion of the Y' term output from the selected entry of lookup table 240, to an adder 275. As seen, this adder thus generates a value Y corresponding to a Taylor result of the form Y=Y'+Y"(x−m). As seen, the extra bits of this output may be annulled in a logic gate 280 in case of a legacy instruction. Accordingly, a reciprocal result is generated that thus corresponds to the input operand. This reciprocal result may be provided to a selected location, such as a destination storage, e.g., a register of a register file.

In addition, the output can be generated in two clock cycles and at a relative accuracy of at least $2^{-14}$. Although shown with this particular implementation in the embodiment of FIG. 2, understand the scope of the present invention is not limited in this regard.

Consider a reciprocal instruction for handling an input operand to an accuracy of $2^{-14}$. Let n be the index for the lookup table. For mantissa 1.x[22:0]=1.x22x21x20x19 ... x0, an entry of the table including both a Y' and Y" term may be selected for index n=x22x21x20x19x18x17 (e.g., using bits x[22:17] the index is constructed as binary number). More specifically, 17 bits of the y' term may be selected as follows:
Y'=0.1$y_1y_2y_3y_4y_5y_6y_7y_8y_9y_{10}y_{11}y_{12}y_{13}y_{14}y_{15}y_{16}y_{17}$; and 11 bits of the y" term may be selected as follows:

$$Y''=\textrm{'}0.y_1y_2y_3y_4y_5y_6y_7y_8y_9y_{10}y_{11}.$$

In one embodiment, the lookup table may include 64 entries for each of the reciprocal and square root reciprocal operations. For the reciprocal entries of the table, the Y' and Y" terms may correspond to:

$$Y'=1/X$$

$$Y''=1/X^2.$$

And for the square root entries of the table, the Y' and Y" terms may correspond to:

$$Y'=1/\sqrt{(2^eX)}$$

$$Y''=2^{e-1}/\sqrt{(2^eX)^3}$$

Consider now a square root reciprocal instruction for handling an input operand to an accuracy of $2^{-14}$. Let n be the index for the lookup table. For mantissa x=1.$x_{22}x_{21}x_{20}x_{19}$ ... $x_0$ and even exponent choose entry Y' and Y" for index n=1$x_{22}x_{21}x_{20}x_{19}x_{18}$. Similar to the above discussion of the reciprocal instruction, select 17 bits of Y': Y'=0.1$y_1y_2y_3y_4y_5y_6y_7y_8y_9y_{10}y_{11}y_{12}y_{13}y_{14}y_{15}y_{16}y_{17}$ and select 11 bits of Y": Y"='0$y_1y_2y_3y_4y_5y_6y_7y_8y_9y_{10}y_{11}$. For mantissa x=1. $x_{22}x_{21}x_{20}x_{19}$ ... $x_0$ and odd exponent choose entry Y' and Y". As was seen before, for index n=01. $x_{22}x_{21}x_{20}x_{19}x_{18}$ and same as before, select 17 bits of Y': Y'=0.1$y_1y_2y_3y_4y_5y_6y_7y_8y_9y_{10}y_{11}y_{12}y_{13}y_{14}y_{15}y_{16}y_{17}$ and select 11 bits of Y": Y"='0.$y_1y_2y_3y_4y_5y_6y_7$ $y_8y_9y_{10}y_{11}$.

As discussed above, for legacy purposes, legacy reciprocal instructions (e.g., RCP and RSQRT) may be maintained with exactly the same result and behavior, although different hardware is being used. For doing so, the lookup table may further include data to maintain the difference between the expected result and the actual result of the lookup table, as discussed above. In one such embodiment, each table entry is accompanied with 5 bits of "legacy_difference[4:0]" and error correction bit "ec". As described above, this difference can be added to the Wallace tree structure of FIG. 2.

Note that in one embodiment, the Y' correction, which may correspond to −2728, may be used to implement a sign magnitude optimization in accordance with an embodiment of the present invention, in which all leading signs are zeroed out. In turn, the 'ec' bit and legacy difference bits can be embedded into the partial product multiplexers, since in the legacy case the lower bits are not needed. Additional bit fiz (fraction is zero) can be introduced into the partial product multiplexers to support $2^n$ and $2^{2n}$ in the reciprocal and square root reciprocal operations, respectively. The fraction may be checked in a hardware outside the structure of FIG. 2 and the fiz bit supplied to the hardware.

The following tables Table 3-Table 9 describe the basic Wallace tree structure in accordance with one embodiment of the present invention.

TABLE 3

| | o | j | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|---|
| pp0 | 0 | 0 | 0 | 0 | 0 | 0 | 0 | 0 | 0 | 0 | 0 | 0 | 0 | 0 | 0 | s# | s | x | x | x | x |
| pp1 | 0 | 0 | 0 | 0 | 0 | 0 | 0 | 0 | 0 | 0 | 0 | 0 | 0 | s# | s | x | x | x | x | x | x |
| pp2 | 0 | 0 | 0 | 0 | 0 | 0 | 0 | 0 | 0 | 0 | 0 | s# | s | x | x | x | x | x | x | x | x |

TABLE 3-continued

| | o | j | 1 | 2 | 3 | 4 | 5 | 6 | 7 | 8 | 9 | 10 | 11 | 12 | 13 | 14 | 15 | 16 | 17 | 18 | 19 | |
|---|---|---|---|---|---|---|---|---|---|---|---|---|---|---|---|---|---|---|---|---|---|---|
| pp3 | 0 | 0 | 0 | 0 | 0 | 0 | 0 | 0 | 0 | s# | s | x | x | x | x | x | x | x | x | x | x | |
| pp4 | 0 | 0 | 0 | 0 | 0 | 0 | 0 | s# | s | x | x | x | x | x | x | x | x | x | x | X | 0 | |
| y' | 0 | 1 | y | y | y | y | y | y | y | y | y | y | y | y | y | y | y | y | Y | 0 | 0 | |
| y'correct | 0 | 0 | 0 | 0 | 0 | 0 | 0 | 1 | 0 | 1 | 0 | 1 | 0 | 1 | 0 | 1 | 0 | 0 | 0 | 0 | 0 | −2728: required for sign magnitude |
| Legacy | | | | | | | | | | | | | | ec | dif4 | dif3 | dif2 | dif1 | dif0 | | | Required for legacy correction |

TABLE 4

| | o | j | 1 | 2 | 3 | 4 | 5 | 6 | 7 | 8 | 9 | 10 | 11 | 12 | 13 | 14 | 15 | 16 | 17 | 18 | 19 | |
|---|---|---|---|---|---|---|---|---|---|---|---|---|---|---|---|---|---|---|---|---|---|---|
| pp0 | 0 | 0 | 0 | 0 | 0 | 0 | 0 | 0 | 0 | 0 | 0 | 0 | 0 | 0/ec | 0 | s# | s/dif2 | x/dif1 | x/dif0 | x | x | |
| pp1 | 0 | 0 | 0 | 0 | 0 | 0 | 0 | 0 | 0 | 0 | 0 | 0 | s# | s/dif4 | x/dif3 | x | x | x | x | x | | |
| pp2 | 0 | 0 | 0 | 0 | 0 | 0 | 0 | 0 | 0 | 0 | s# | s | x | x | fiz0/x | fiz1/x | fiz0/x | x | x | x | | |
| pp3 | 0 | 0 | 0 | 0 | 0 | 0 | 0 | 0 | 0 | s# | s | x | x | x | x | x | x | x | x | x | | |
| pp4 | 0 | 0 | 0 | 0 | 0 | 0 | 0 | s# | s | x | x | x | x | x | x | x | x | x | x | X | 0 | fiz1:= fiz0 AND uop_rsqrt |
| y' | 0 | 1 | y | y | y | y | y | y | y | y | y | y | y | y | y | y | y | y | Y | 0 | 0 | fiz0 := NOT(is_classic_sse) AND fraction_is_zero |
| y'correct | 0 | 0 | 0 | 0 | 0 | 0 | 0 | 1 | 0 | 1 | 0 | 1 | 0 | 1 | 0 | 1 | 0 | 0 | 0 | 0 | 0 | −2728: this is required for sign magnitude |

TABLE 5

| | o | j | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|---|---|
| pp0 | 0 | 0 | 0 | 0 | 0 | 0 | 0 | 0 | 0 | 0 | 0 | 0 | 0 | 0/ec | 0 | s# | s/dif2 | x/dif1 | x/dif0 | x | x |
| pp1 | 0 | 0 | 0 | 0 | 0 | 0 | 0 | 0 | 0 | 0 | 0 | 0 | s# | s/dif4 | x/dif3 | x | x | x | x | x | |
| pp2 | 0 | 0 | 0 | 0 | 0 | 0 | 0 | 0 | 0 | 0 | s# | s | x | x | fiz0/x | fiz1/x | fiz0/x | x | x | x | |
| level0b | | | | | | | | | | | | | | | | 3:2CSA (8 bits) | | | | | | |
| sum1 | | | | | | | | | | s# | s | sum1 | sum1 | sum1 | sum1 | sum1 | sum1 | sum1 | | | | |
| carry1 | | | | | | | | | | | | car1 | car1 | car1 | car1 | car1 | car1 | car1 | | | | |

TABLE 6

| | o | j | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|---|---|
| pp3 | 0 | 0 | 0 | 0 | 0 | 0 | 0 | 0 | 0 | s# | s | x | x | x | x | x | x | x | x | x |
| pp4 | 0 | 0 | 0 | 0 | 0 | 0 | 0 | s# | s | x | x | x | x | x | x | x | x | x | x | X |
| y' | 0 | 1 | y | y | y | y | y | y | y | y | y | y | y | y | y | y | y | y | Y | 0 |
| level0a | | | | | | | | | | | | | | | 3:2CSA (13 bits) | | | | | | |
| sum2 | 0 | 1 | y | y | y | y | sum2 | sum2 | sum2 | sum2 | sum2 | sum2 | sum2 | sum2 | sum2 | sum2 | sum2 | sum2 | sum2 | sum2 |
| carry2 | | | | | | | car2 | car2 | car2 | car2 | car2 | car2 | car2 | car2 | car2 | car2 | car2 | car2 | car2 | car2 |

TABLE 7

| | o | j | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|---|---|
| sum1 | | | | | | | | | | | s# | s | sum1 | sum1 | sum1 | sum1 | sum1 | sum1 | sum1 | sum1 |
| carry1 | | | | | | | | | | | | 0 | car1 | car1 | car1 | car1 | car1 | car1 | car1 | car1 |
| sum2 | 0 | 1 | y | y | y | y | sum2 | sum2 | sum2 | sum2 | sum2 | sum2 | sum2 | sum2 | sum2 | sum2 | sum2 | sum2 | sum2 | sum2 |
| level1 | | | | | | | | | | | | | | 3:2CSA (9 bits) | | | | | | | |
| sum3 | 0 | 1 | y | y | y | y | sum2 | sum2 | sum2 | sum2 | sum3 | sum3 | sum3 | sum3 | sum3 | sum3 | sum3 | sum3 | sum3 | sum3 |
| carry3 | | | | | | | | | | | car3 | car3 | car3 | car3 | car3 | car3 | car3 | car3 | car3 | |

TABLE 8

| | o | j | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|---|
| sum3 | 0 | 1 | y | y | y | y | y | sum2 | sum2 | sum2 | sum2 | sum3 | sum3 | sum3 | sum3 | sum3 | sum3 | sum3 | sum3 |
| carry3 | | | | | | | | 0 | 0 | 0 | 0 | car3 | car3 | car3 | car3 | car3 | car3 | car3 | car3 |
| carry2 | | | | | | | car2 | car2 | car2 | car2 | car2 | car2 | car2 | car2 | car2 | car2 | car2 | car2 | car2 |
| level2 | | | | | | | | | | | | 3:2CSA (13 bits) | | | | | | | |
| sum4 | 0 | 1 | y | y | y | y | sum4 | sum4 | sum4 | sum4 | sum4 | sum4 | sum4 | sum4 | sum4 | sum4 | sum4 | sum4 | sum4 |
| carry4 | | | 0 | 0 | 0 | car4 | car4 | car4 | car4 | car4 | car4 | car4 | car4 | car4 | car4 | car4 | car4 | car4 | car4 |

TABLE 9

| | o | j | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|
| level3 | | | | | | | | | 16 bits CPA | | | | | | | | | |
| | | | | | | | | | | | | | | | AND GSSE | | | |

Figure 3:
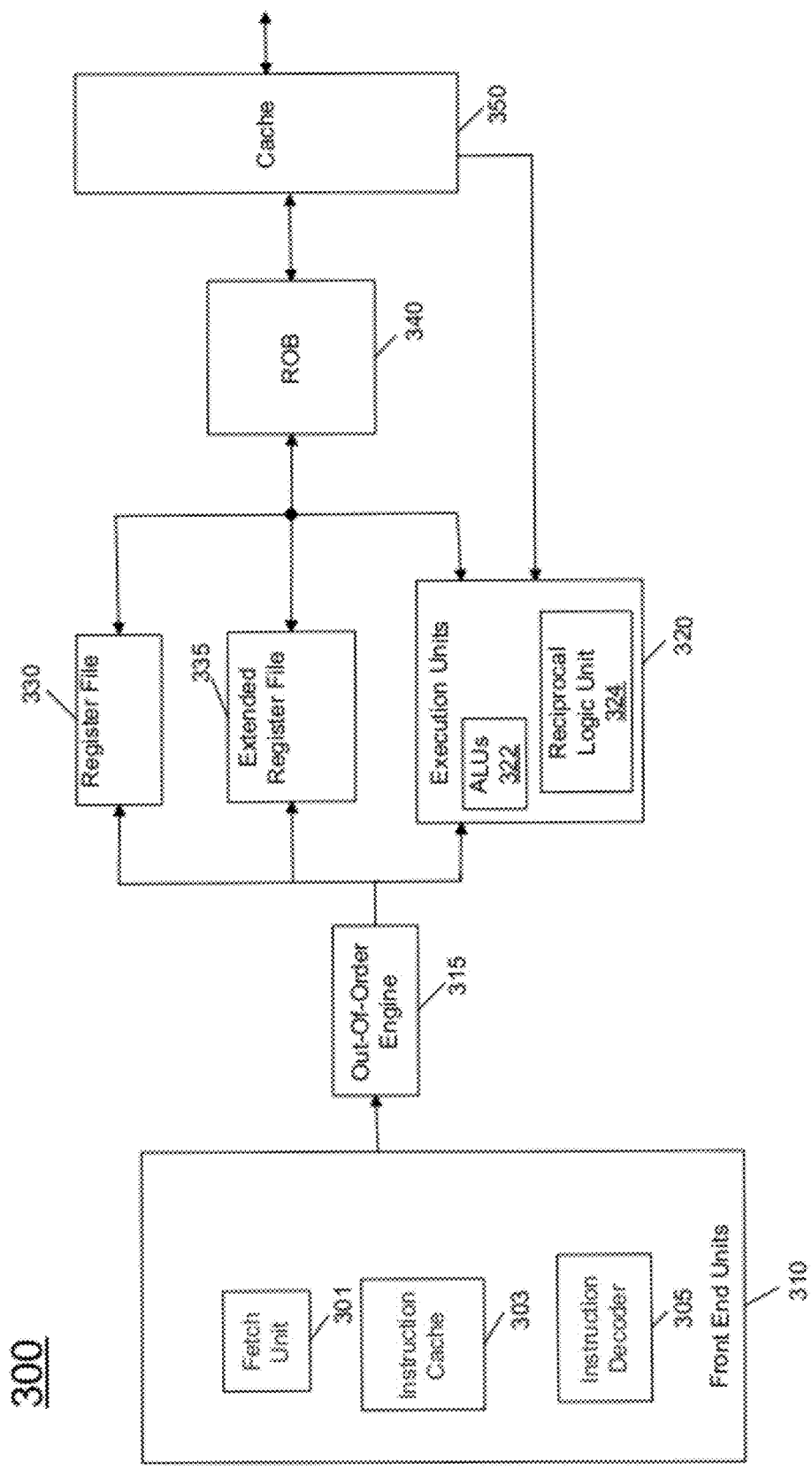
FIG. 3 is a block diagram of a processor core in accordance with one embodiment of the present invention.

Embodiments can be implemented in many different systems. For example, embodiments can be realized in a processor such as a multicore processor. Referring now to FIG. 3, shown is a block diagram of a processor core in accordance with one embodiment of the present invention. As shown in FIG. 3, processor core 300 may be a multi-stage pipelined out-of-order processor. Processor core 300 is shown with a relatively simplified view in FIG. 3 to illustrate various features used in connection with performing reciprocal instructions in accordance with an embodiment of the present invention.

As shown in FIG. 3, core 300 includes front end units 310, which may be used to fetch instructions to be executed and prepare them for use later in the processor. For example, front end units 310 may include a fetch unit 301, an instruction cache 303, and an instruction decoder 305. In some implementations, front end units 310 may further include a trace cache, along with microcode storage as well as a micro-operation storage. Fetch unit 301 may fetch macro-instructions, e.g., from memory or instruction cache 303, and feed them to instruction decoder 305 to decode them into primitives, i.e., micro-operations for execution by the processor.

Coupled between front end units 310 and execution units 320 is an out-of-order (OOO) engine 315 that may be used to receive the micro-instructions and prepare them for execution. More specifically OOO engine 315 may include various buffers to re-order micro-instruction flow and allocate various resources needed for execution, as well as to provide renaming of logical registers onto storage locations within various register files such as register file 330 and extended register file 335. Register file 330 may include separate register files for integer and floating point operations. Extended register file 335 may provide storage for vector-sized units, e.g., 256 or 512 bits per register.

Various resources may be present in execution units 320, including, for example, various integer, floating point, and single instruction multiple data (SIMD) logic units, among other specialized hardware. For example, such execution units may include one or more arithmetic logic units (ALUs) 322. In addition, a reciprocal logic unit 324 in accordance with an embodiment of the present invention may be located within execution units 320. This logic unit may receive an input operand, e.g., from one of the register files and furthermore may receive a uop corresponding to a given reciprocal instruction. In the case of a legacy reciprocal instruction, the logic unit will perform the reciprocal operation to a legacy accuracy, e.g., using information present in the entries of this lookup table. Or the instruction can be a reciprocal instruction in accordance with an embodiment of the present invention, in which case a relative accuracy of $2^{-14}$ can be obtained in a single iteration. Results may be provided to retirement logic, namely a reorder buffer (ROB) 340. More specifically, ROB 340 may include various arrays and logic to receive information associated with instructions that are executed. This information is then examined by ROB 340 to determine whether the instructions can be validly retired and result data committed to the architectural state of the processor, or whether one or more exceptions occurred that prevent a proper retirement of the instructions. Of course, ROB 340 may handle other operations associated with retirement.

As shown in FIG. 3, ROB 340 is coupled to a cache 350 which, in one embodiment may be a low level cache (e.g., an L1 cache). Also, execution units 320 can be directly coupled to cache 350. From cache 350, data communication may occur with higher level caches, system memory and so forth. While shown with this high level in the embodiment of FIG. 3, understand the scope of the present invention is not limited in this regard.

Figure 4:
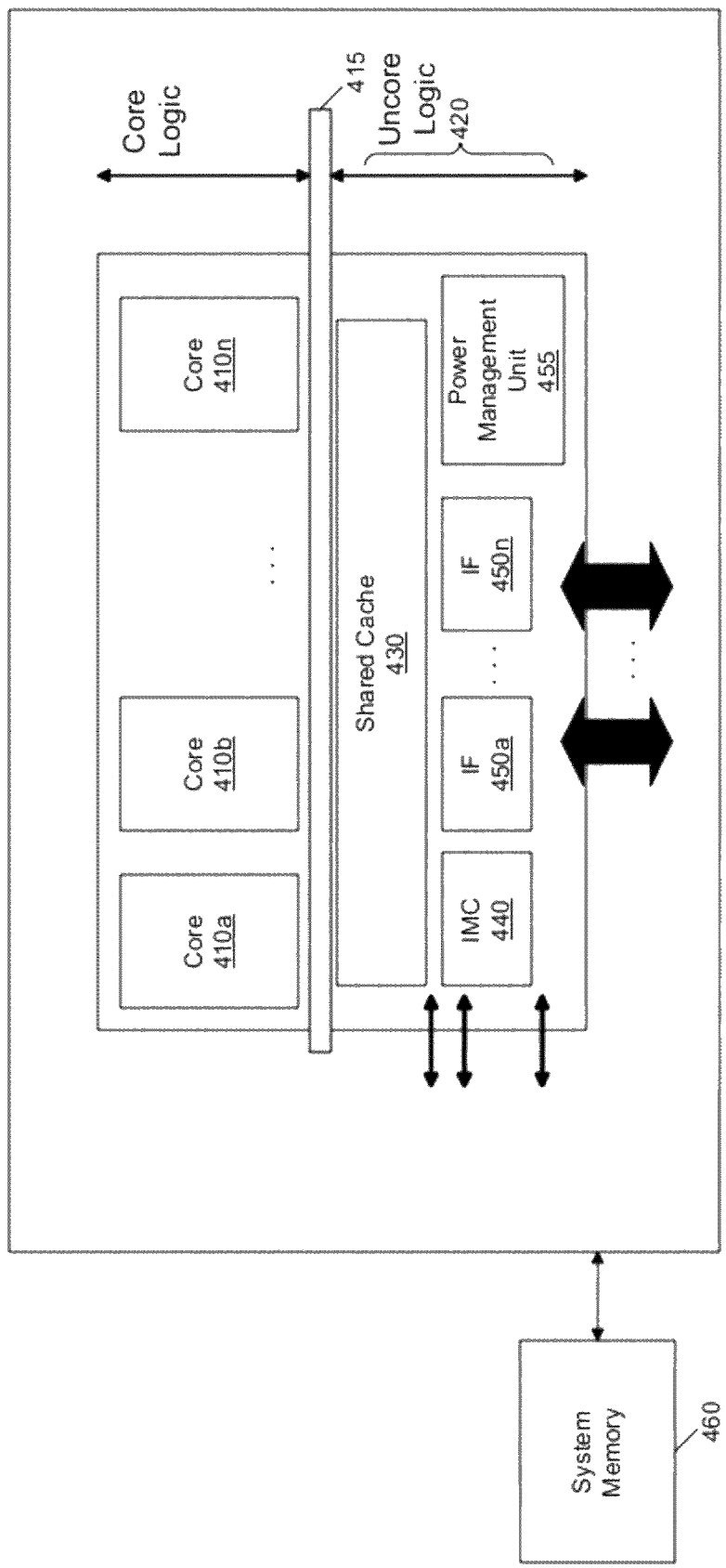
FIG. 4 is a block diagram of a processor in accordance with an embodiment of the present invention.

Referring now to FIG. 4, shown is a block diagram of a processor in accordance with an embodiment of the present invention. As shown in FIG. 4, processor 400 may be a multicore processor including a plurality of cores $410_a$-$410_n$. In one embodiment, each such core may be configured as core 300 described above with regard to FIG. 3. The various cores may be coupled via an interconnect 415 to an uncore 420 that includes various components. As seen, the uncore 420 may include a shared cache 430 which may be a last level cache. In addition, the uncore may include an integrated memory controller 440, various interfaces 450 and a power management unit 455. As seen, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 4, the scope of the present invention is not limited in this regard.

Figure 5:
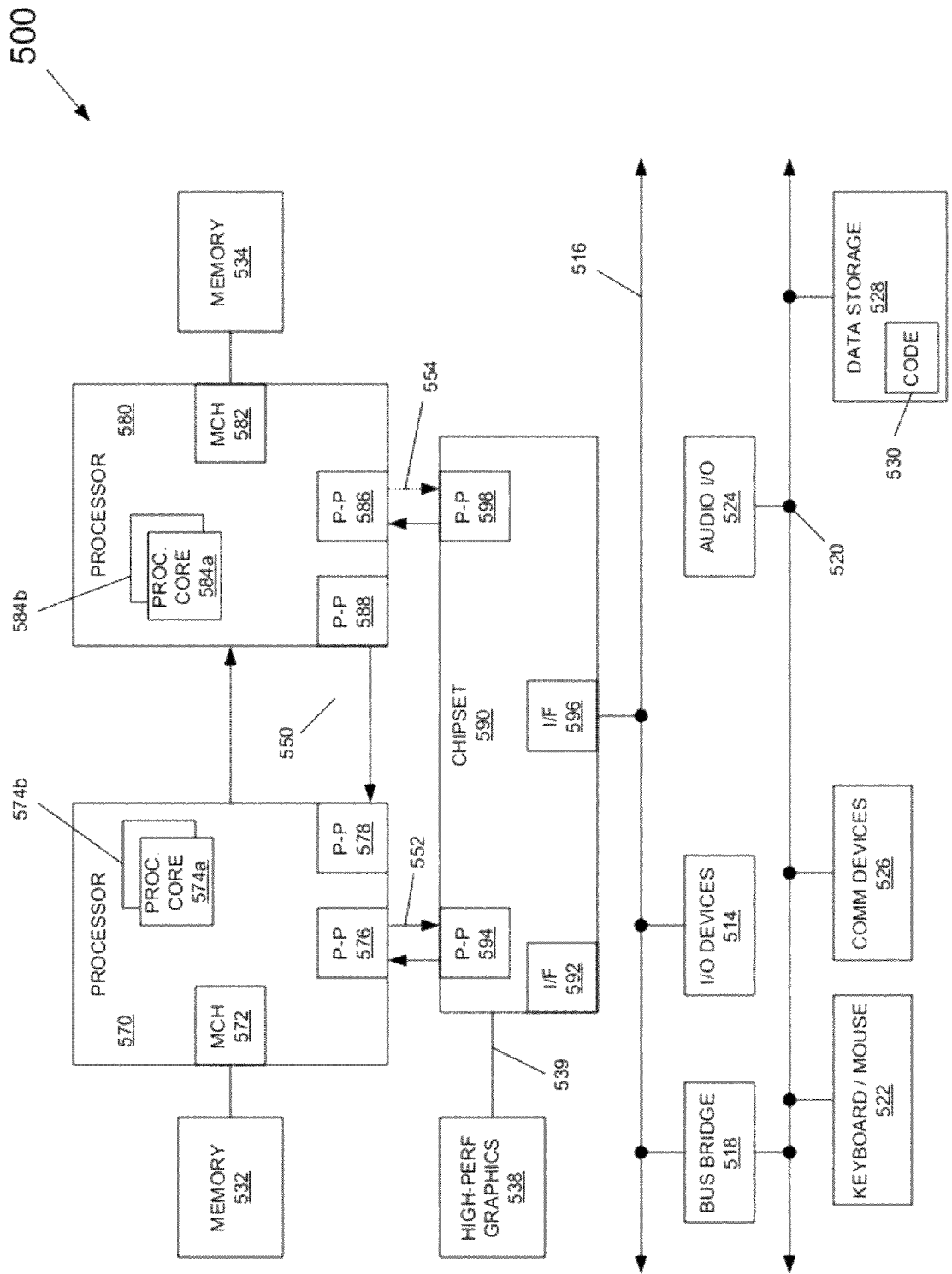
FIG. 5 is a block diagram of a system in accordance with an embodiment of the present invention.

Embodiments may be implemented in many different system types. Referring now to FIG. 5, shown is a block diagram of a system in accordance with an embodiment of the present invention. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., processor cores 574a and 574b and processor cores 584a and 584b), although potentially many more cores may be present in the processors.

Still referring to FIG. 5, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 5, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may lie coupled to a chipset 590 via P-P interconnects 552 and 554, respectively. As shown in FIG. 5, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 5, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of non-transitory storage medium such as a disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a processor having an execution unit including a plurality of logic units to execute instructions, the execution unit including:
   a first selector to select a first portion or a second portion of an input operand based on whether an instruction is to perform a reciprocal operation or a square root reciprocal operation;
   a lookup table coupled to the first selector and including a plurality of entries, wherein the output of the first selector is to access a given one of the plurality of entries, each of the entries including a first term, a second term, and a legacy portion, wherein the first and second terms are set at a midpoint of an interval;
   a reciprocal logic unit including a plurality of levels of carry save adders (CSA) to receive the accessed entry and a portion of the input operand and to generate a reciprocal result for the input operand responsive to the instruction, wherein the first term is to be provided from the lookup table to a first level of the CSA adders;
   an encoder to receive a selection signal from a second selector, the second selector to output a portion of the input operand if the instruction is a reciprocal instruction or a square root reciprocal instruction and is to output a first value instead if the instruction is a legacy instruction; and
   wherein the legacy portion is used to generate a legacy result when the instruction is one of a legacy reciprocal instruction and a legacy square root reciprocal instruction.

2. The apparatus of claim 1, further comprising a third selector coupled to the second selector, wherein the third selector is to provide a first portion of the input operand to the second selector if the instruction is the reciprocal instruction and to provide a second portion of the input operand to the second selector if the instruction is the square root reciprocal instruction.

3. The apparatus of claim 1, wherein the legacy instruction is to provide a result having a lower relative accuracy than the reciprocal instruction or the square root reciprocal instruction.

4. The apparatus of claim 3, wherein the reciprocal instruction and the square root reciprocal instruction are to provide a relative accuracy of at least $2^{-14}$.

5. The apparatus of claim 1, further comprising a set of multiplexers controlled by an output of the encoder, wherein each of the set of multiplexers is to provide a partial product value to a first level of the CSA adders, the partial product value generated using the encoder output and a selected one of a plurality of inputs to the multiplexer, wherein the encoder output is to select the one of the plurality of inputs.

6. The apparatus of claim 1, further comprising a second level CSA adder coupled to receive an output of the first level of the CSA adders.

7. The apparatus of claim 6, further comprising a third level CSA adder coupled to receive an output of the second level CSA adder and a portion of the output of the first level of the CSA adders.

8. The apparatus of claim 5, wherein the legacy portion is to be provided to low order bits of a first one of the set of multiplexers to generate the legacy result.

9. The apparatus of claim 1, wherein each of the first terms of the entries is compensated by a correction value to provide a sign magnitude correction for the reciprocal logic unit.

10. The apparatus of claim 9, wherein the correction value is to zero out leading sign bits of the multiplexer outputs.

11. The apparatus of claim 1, wherein the reciprocal logic unit is to generate the reciprocal result in a single iteration.

12. A method comprising:
    receiving a reciprocal instruction and an input operand in a processor;
    accessing an entry of a lookup table based on a portion of the input operand and the instruction, the lookup table including a plurality of entries, each of the entries including a first term, a second term, and a legacy portion, wherein the first and second terms are related to a midpoint of an interval;
    generating an encoder output based on a type of the reciprocal instruction and whether the reciprocal instruction is a legacy instruction, wherein the encoder is to receive a selection signal from a second selector, the second selector to output a portion of the input operand if the reciprocal instruction is not a legacy instruction and to output a first value instead if the reciprocal instruction is a legacy instruction, wherein the legacy portion is used to generate a legacy result when the reciprocal instruction is one of a legacy reciprocal instruction and a legacy square root reciprocal instruction; and selecting portions of the accessed lookup table entry and input operand to be provided to a reciprocal logic unit including a plurality of levels of carry save adders (CSA) to receive the accessed lookup table entry and a portion of the input operand and to generate a reciprocal result for the input operand responsive to the reciprocal instruction, wherein the first term is to be provided from the lookup table to a first level of the CSA adders based on the encoder output.

13. The method of claim 12, further comprising processing the selected portions in a Wallace tree structure of the reciprocal logic unit.

14. The method of claim 13, further comprising outputting a reciprocal value from the Wallace tree structure in a single iteration responsive to the reciprocal instruction.

15. A system comprising:

a processor having a plurality of cores, each core including a front end to receive and decode instructions, an out-of-order (OOO) engine coupled to the front end to receive instructions, and an execution unit coupled to the OOO engine to receive and execute instructions, the execution unit including a first selector to select a first portion or a second portion of an input operand based on whether an instruction is to perform a reciprocal operation or a square root reciprocal operation, a lookup table coupled to the first selector and including a plurality of entries, wherein the output of the first selector is to access a given one of the plurality of entries, each of the entries including a first term, a second term, and a legacy portion, wherein the first and second terms are set at a midpoint of an interval, and a reciprocal logic unit including a plurality of levels of carry save adders (CSA) to receive the accessed entry and a portion of the input operand and to generate a reciprocal result for the input operand responsive to the instruction in a single iteration, wherein the first term is to be provided from the lookup table to a first level of the CSA adders and an encoder is to receive a selection signal from a second selector, the second selector to output a portion of the input operand if the instruction is a reciprocal instruction or a square root reciprocal instruction and to output a first value instead if the instruction is a legacy instruction, wherein the legacy portion is used to generate a legacy result when the instruction is one of a legacy reciprocal instruction and a legacy square root reciprocal instruction; and a dynamic random access memory (DRAM) coupled to the processor.

16. The system of claim 15, further comprising a third selector coupled to the second selector, wherein the third selector is to provide a first portion of the input operand to the second selector if the instruction is the reciprocal instruction and to provide a second portion of the input operand to the second selector if the instruction is the square root reciprocal instruction.

* * * * *